United States Patent [19]

Sasaki et al.

[11] Patent Number: 4,663,688
[45] Date of Patent: May 5, 1987

[54] MAGNETIC TAPE CASSETTE WITH IMPROVED SPRING MEMBER

[75] Inventors: Shin Sasaki; Masahiro Makino, both of Miyagi, Japan

[73] Assignee: Sony Corporation, Tokyo, Japan

[21] Appl. No.: 819,046

[22] Filed: Jan. 15, 1986

[30] Foreign Application Priority Data

Jan. 19, 1985 [JP] Japan ................................ 35-5576

[51] Int. Cl.⁴ .......................................... G11B 23/08
[52] U.S. Cl. .................................................. 360/132
[58] Field of Search ...................... 360/132; 242/198

[56] References Cited

U.S. PATENT DOCUMENTS 4,418,373 11/1983 Fujimori et al. ..................... 360/132
4,449,677 5/1984 Ohta et al. ........................... 242/199
4,482,104 11/1984 Saito ................................... 242/198
4,591,936 5/1986 Kikuya et al. ....................... 360/132

Primary Examiner—Robert S. Tupper
Attorney, Agent, or Firm—Vorys, Stater, Seymour & Pease

[57] ABSTRACT

In a video tape cassette having upper and define a substantially rectangular housing with an opening extending along a side thereof between end walls of the housing for containing reels having tape wound thereon and guided between the reels in a run extending across the opening, and a lid structure which is pivotally mounted on the housing for movement by a coil spring from an open position exposing the tape run to a closed position in which the lid structure covers the tape run; the assembling of the tape cassette is facilitated by providing anchors on the lid structure by which the coil spring is initially or tentatively located during the mounting of the lid structure on one the housing portions, whereupon the coil spring is transferred into engagement with an anchor on that one housing portion in preparation for assembling of the latter with the other housing portion. An improved coil spring has a leg portion which defines an area of contact with a latch element which is greater than that defined by the length of the leg portion, such as by binding the end of the leg portion.

11 Claims, 12 Drawing Figures

MAGNETIC TAPE CASSETTE WITH IMPROVED SPRING MEMBER

CROSS-REFERENCE TO RELATED APPLICATION

This application is a continuation-in-part of copending U.S. patent application, Ser. No. 651,452, filed Sept. 17, 1984, assigned to the assignee of this application.

BACKGROUND OF THE INVENTION

1. Field of the Invention

This invention relates generally to tape cassettes, and more particularly, is directed to improvements in tape cassettes for use in a recording and/or reproducing apparatus, such as video tape recorders and the like. Still more particularly, the invention relates to an improved coil spring with an enhanced area of contact with a latch element for releasing a lid structure of the cassette.

Still more particularly, this invention relates to an improved coil spring having a leg portion bent to improve its effective surface contact with a mating surface on a lid latch element and to an enhanced spring contact abutment area on the lid latch element.

2. Description of the Prior Art

A tape cassette for use in a conventional video tape recorder (hereinafter referred to as a VTR) is provided with an opening extending along one side of the cassette housing and with a cutout in the bottom of the housing communicating with such opening. The magnetic tape wound on reels rotatable within the cassette housing is guided in a run extending across the opening and, when the tape cassette is loaded in a cassette holder of the VTR, tape loading pins mounted on a loading ring are inserted into the cutout of the cassette housing in back of such tape run. Upon rotation of the loading ring, the tape loading pins engage the tape in the run between the reels, withdraw the tape from the cassette housing and wrap the withdrawn tape around the peripheral surface of a guide drum of the VTR. The conventional tape cassette is usually provided with a lid which is movable on the cassette housing between a closed position covering the opening of the housing and an open position to which the lid is moved when the cassette is placed in the cassette holder and in which the tape run extending across the housing opening is fully exposed.

Although the lid of the foregoing conventional tape cassette, when in its closed position, is intended to prevent accidental damage to the run of the tape extending across the opening of the cassette housing, such lid, even when in its closed position only covers the outer surface of the tape run. Therefore, dust or the like may adhere to the back surface of the tape run which is exposed through the cutout in the bottom of the cassette housing even when the lid is in its closed position. As a result, dropouts may occur in the recording and reproducing of signals on the tape.

In order to provide increased protection for the tape in a cassette of the described type, it has been proposed, for example, in U.S. Pat. No. 4,418,373, issued Nov. 29, 1983, and having a common assignee herewith, to provide the cassette housing with a lid structure which, when in a closed position, that is, when the cassette is not in use, completely encloses the tape run extending between the reels across an opening of the cassette housing. Such lid structure is urged to its closed position by a coil spring associated therewith, and which gives rise to difficulties in assembling the tape cassette.

Other examples of tape cassettes are shown in U.S. Pat. Nos. 4,449,677 and 4,482,104, each of which is assigned to the assignee of the instant invention.

In addition, in the parent application, it was proposed to provide a tape cassette, as aforesaid, having a coil spring by which a lid structure of the cassette housing is urged to a closed position and in which an arrangement is provided for facilitating the position of such coil spring during the assembly of the various parts of the cassette. In the embodiment there shown, however, the angularly disposed leg portion of the coil spring was in the form of an elongated wire leg which provided limited contact area between the outer surface of the generally cylindrical wire and the irregular, but rounded mating receiving surface on the lid latch element. Because the free end of the elongated leg portion of the coil spring was located remote from a main spring anchor for the coil portion of the spring, lateral movement was possible between the walls of a space provided for contact with the leg portion of the coil spring with a rounded abutment on the housing of the latch element. Such structure sometime permitted, such as after an impact on the cassette from dropping or the like, the relatively free end of a coil spring to move laterally out of engagement with the latch element, inhibiting the latch release function for the lid.

Accordingly, it is a primary object of this invention to improve the contact between the leg portion of the coil spring and the rounded abutment spring-receiving end of the latch element for the lid, in a tape cassette of the type described.

SUMMARY OF THE INVENTION

In accordance with an aspect of the invention, a tape cassette comprises upper and lower housing portions assembled together to define a housing of substantially rectangular configuration having end walls and an opening along a side of the housing between such end walls, reels rotatably contained in the housing and having tape wound thereon, guide means in the housing leading the tape between the reels in a run extending across the opening, lid means having ears at its opposite ends pivotally engageable with the end walls to define a pivot axis of the lid means about which the latter is movable between open and closed positions, coil spring means including a coil portion and angularly displaced leg portions extending from the coil portion, first and second spring anchor means located on one of the ears and being tentatively or initially engageable with the leg portions of the coil spring means for initial positioning of the latter relative to the lid means, and third spring anchor means on one of the housing portions adjacent one of the end walls and to which one of the leg portions of the coil spring means is transferred when assembling the lid means in respect to said one portion of the housing, whereupon the coil spring means urges the lid means to one of its open and closed positios relative to the housing.

The improved coil spring means, in accordance with a main feature of the invention emphasized in this application, comprises a coil portion having angularly displaced leg portions extending from the coil portion, one of which engages an abutment surface on a lid latch element. The thus-engaged leg portion at about its area of contact defines an enhanced surface for contacting the mating surface of the abutment surface on the lid latch. Preferably, the enhanced surface of the leg portion is defined by a bent portion of the coil spring, wherein the bent portion lies in a plane approximately parallel to the plane of the contacting surface on the abutment surface of the latch element. In form, the bend may be semi-circular, which is preferable, lying in a plane normal to the axis of the leg portion of the coil spring and parallel to the contacting surface on the latch element. Other geometric shapes providing the enhanced contact are also possible, such as a circular shape, triangular shape or the like. The maximum distance of the most remote portion of the bent portion of the leg portion of the coil spring is limited by the width of the channel which receives the latch element so that the leg portion also lies in that channel. Preferably, the leg portion of the spring member is bent at a short pitch. In addition, the contact area of the abutment surface may be enlarged at about an angle equal to the angle subtended by the leg portion of the spring, thus to provide a secure rest for the bent portion of the spring leg.

The above and other objects, features, and advantages of the invention will become apparent from the detailed description of the invention taken in conjunction with the drawings as follows.

DETAILED DESCRIPTION OF A PREFERRED EMBODIMENT

Figure 1:
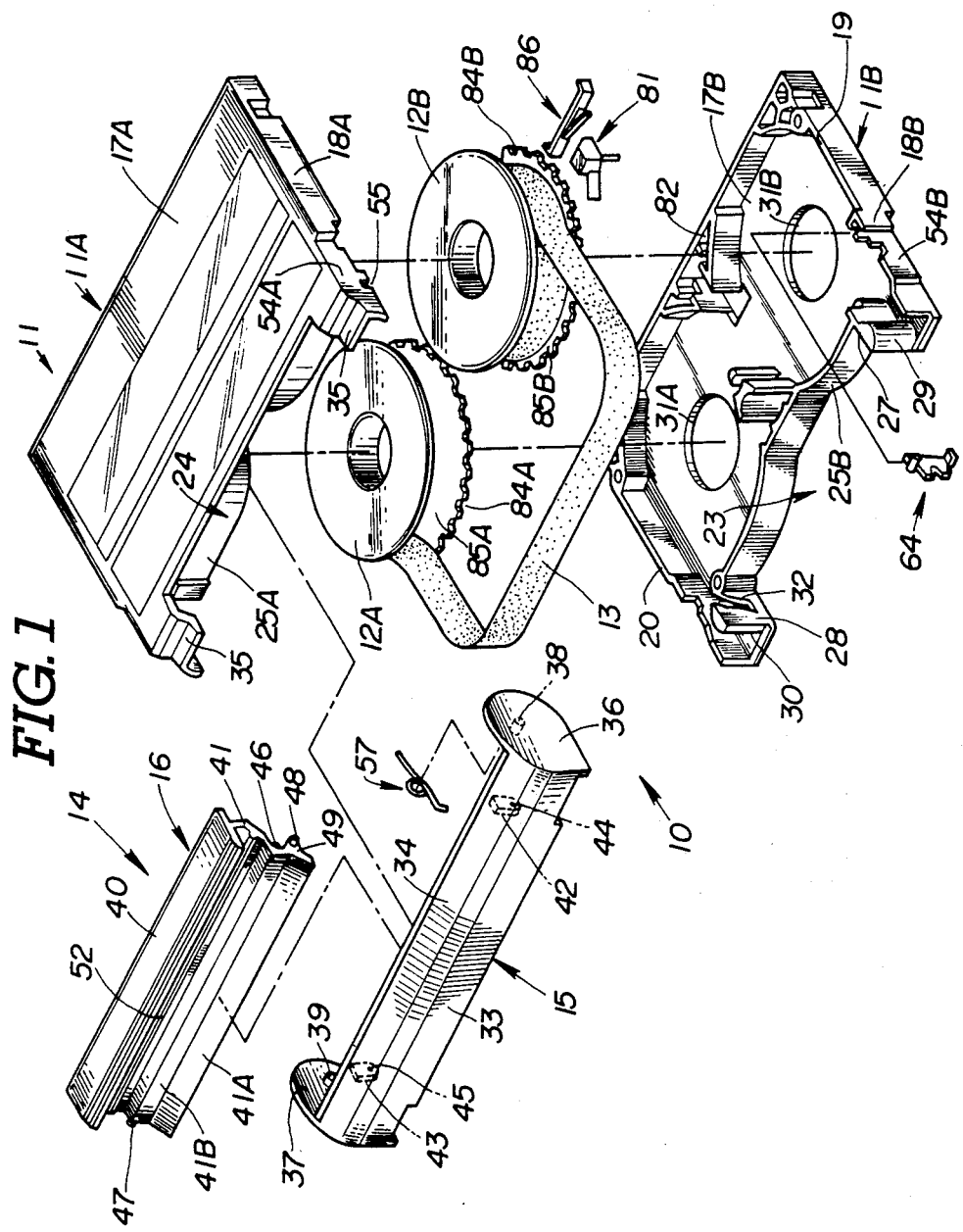
FIG. 1 is an exploded perspective view, for background, showing the various major components of a video tape cassette in accordance with a prior embodiment of this invention.

Referring to the drawings in detail, and initially to FIG. 1, it will be seen that the invention is there shown applied to a tape cassette 10 of a type intended for use in a video tape recorder (VTR). The cassette 10 generally comprises a substantially rectangular cassette housing 11 composed of upper and lower housing portions 11A and 11B, a pair of reels 12A and 12B rotatably contained in the housing 11 in a side-by-side relation and having a magnetic tape 13 wound on the reels, and a lid assembly 14 composed of an outer lid member 15 and an inner lid member 16. The lid assembly 14 is pivotally mounted on the housing 11 for movement between open and closed positions. In the open position of the lid assembly 14, a run of the tape between reels 12A and 12B is exposed for withdrawal from the housing 11 and, in the closed position, the lid assembly 14 covers or encloses the tape run both at the back and front of the tape run.

The upper and lower housing portions 11A and 11B are shown to have substantially rectangular top and bottom walls 17A and 17B, respectively. Flanges 18A and 18B extend along the margins of the top and bottom walls 17A and 17B, respectively, and engage each other at a plane of separation, substantially parallel with walls 17A and 17B when housing portions 11A and 11B are brought together vertically, that is, in a direction normal to the plane of separation for defining a peripheral structure of the housing which includes end walls 19 and 20 at the opposite relatively short ends of housing 11 and a back or side wall 21 along one of the relatively long sides of the rectangular housing. At the front or other long side of the housing 11, there is a tape run opening, located between the front and rear lid assemblies, extending substantially from one to the other of the end walls 19 and 20, and the bottom wall 17B has an approximately trapezoidal cutout 23 communicating with the tape run opening at the front of the housing. The width of the cutout 23 is smaller than that of the opening 22, that is, the ends of the cutout 23 are spaced inwardly from the end walls 19 and 20. A substantially rectangular cutout 24 which is approximately as wide as the cutout 23 is formed in the forward portion of the top wall 17A and has a depth smaller than the depth of the cutout 23 measured at the middle of the housing 11. A flange 25A with curving portions depends from the top wall 17A in back of the cutout 24 and mates with a flange 25B having similar curving portions directed upwardly from the bottom wall 17B along the back edge of the cutout 23. When the housing portions 11A and 11B are brought vertically together, the flanges 25A and 25B mate to define a partition within the cassette 10 by which a space containing the reels 12A and 12B within housing 11 is isolated from the tape run opening and the cutout 23.

At the opposite ends of the cutout 23, the lower housing portion 11B is formed or molded with upstanding walls 27 and 28 directed forwardly from the opposite ends of the flange 25B. The walls 27 and 28 are higher than the flange 25B so as to extend from the outwardly directed surfaces of the walls 27 and 28 which are spaced from the end walls 19 and 20 and are formed with rounded or semi-cylindrical surface portions 29 and 30 acting as tape guides at the opposite ends of the tape run opening. The bottom wall 17B has laterally spaced apart circular apertures 31A and 31B in which hubs of the reels 12A and 12B, respectively, are loosely received for rotatably locating the reels in a space within the cassette, and through which drive shafts or spindles (not shown) of a VTR can conventionally engage the hubs of the reels 12A and 12B when the cassette 10 is operatively positioned in the VTR.

The tape extending between the reels 12A and 12B is directed forwardly from the reels and about the guides 29 and 30 so as to establish the tape run extending across the tape run opening. The walls 27 and 28 are further shown to have curving guide grooves 32 extending approximately vertically in their inwardly directed surfaces and are operative, as hereinafter described in detail, to control pivoting movement of the inner lid member 16 relative to the outer lid member 15 during the movements of the latter between the open and closed positions of the lid assembly 14.

The outer lid member 15 is shown to have a front wall portion 33 which is laterally elongated to have a length substantially equal to the distance between the end walls 19 and 20 of the housing 11. The outer lid member 15 further includes a shallow top wall portion 34 extending from the upper edge of the front wall portion 33 and having a width smaller than the depth of the cutout 24 in the top wall 17A so as to be engageable over depressed, shelf-like extensions 35 of the top wall 17A at the opposite ends of the cutout 24. The member 15 also has ears 36 and 37 directed rearwardly from the opposite ends of the front and top wall portions 33 and 34 and having inwardly-directed pivot pins or trunnions 38 and 39, respectively, for pivotally mounting the outer lid member 15 on the end walls 19 and 20, as hereinafter described in greater detail. When thus pivotally connected with the housing 11, the outer lid member 15, in its closed position shown in full lines on FIGS. 3 and 4, has its front wall portion 33 covering the front surface of the tape run, while the top wall portion 34 of the lid member 15 extends over the tape run. However, in such a closed position of the outer lid member 15, the back edge of the top wall portion 34 thereof is spaced substantially from the longitudinal edge of the top wall 17A along the cutout 24 so as to leave a gap therebetween which is to be filled or closed by the inner lid member 16.

The inner lid member 16 has a length substantially equal to that of the cutout 24 and includes an elongated head portion 40 dimensioned to span the gap between the longitudinal edge of the cutout 24 and the top wall portion 34 of the outer lid member 15 in the closed position of the latter. The inner lid member 16 also has an angled skirt portion 41 extending generally downwardly and forwardly from the head portion 40 along the length of the latter. The skirt portion 41 of the inner lid member 16 is dimensioned so that, when the lid assembly 14 is in its closed position with the head portion 40 spanning and closing the gap between the longitudinal edge of the cutout 24 and the top wall portion 34 of the outer lid member 15, the skirt portion 41 extends downwardly behind the tape run with the lower edge part 41A of the skirt portion 41 substantially abutting the lower edge portion of the front wall portion 33 under the tape run. Thus, the tape run is substantially enclosed and protected within a space defined between the lid members 15 and 16 in the closed position of the assembly 14 and there is no possibility of dust accumulating on, or other injurious contact with, the back surface of the tape run through the cutout 23.

Mounting lugs 42 and 43 are desirably molded integrally with the top wall portion 34 of the outer lid member 15 at laterally spaced locations corresponding to the ends of the inner lid member 16, and are formed with holes 44 and 45 for pivotally receiving aligned pins 46 and 47 extending from opposite ends of an intermediate part 41B of the skirt portion 41. The lug members 42 and 43 are desirably laterally resilient, while the end surfaces of the pivot pins 46 and 47 are oblique or slanted to permit such pivot pins to be snapped into the respective holes 44 and 45 of the mounting lugs. Upon engagement of the pins 46 and 47 in the holes of the mounting lugs 42 and 43, the inner lid member 16 is mounted on the outer lid member 15 for pivotal movement in respect to the latter between the previously described closed position of the lid assembly 14, in which the lower edge part 41A of the skirt portion 41 substantially engages against the lower edge of the front wall portion 33 for enclosing and protecting the tape run between the lid members 15 and 16. It will be seen that, in such open position of the lid assembly 14, the head portion 40 of the inner lid member 16 overlies the top portion 34 of the outer lid member, while the skirt portion 41 of the inner lid member extends substantially parallel to the front wall portion 33 of the outer lid member 15. Thus, in the open position of the lid assembly 14, the end edge part 41A of the skirt portion 41 is spaced substantially away from the free edge part of the front wall portion 33 so as to avoid any interference with the entry or withdrawal of the tape run in the space between the front wall portion 33 and the skirt portion 41 as the lid assembly 14 is moved to and from its closed position.

Such movements of the inner lid member 16 relative to the outer lid member 15 are effected with respect to pivotal movements of the outer lid member 15 relative to the housing 11 by means of follower pins 48 which are directed outwardly from arms 49 at the opposite ends of the free edge part 41A of the skirt portion 41 and which are slidably engageable in the cam or guide grooves 32 in the end walls 27 and 28. The illustrated shape of each of the cam or guide grooves 32 is selected to ensure that the lower edge part 41A of the skirt portion 41 comes close to the lower edge of the front wall portion 33 only when the lid assembly 14 is approximately at its fully closed position for avoiding any contact of the lid assembly with the tape run during movements between the open and closed positions of the lid assembly even if there is some slack in the tape run. Furthermore, the cam or guide grooves 32 are shaped to ensure that, in the open position of the lid assembly, the wall portions 33 and 34 of the outer lid member 15 and the entire inner lid member 16 are disposed above the plane of the top wall 17A. Thus, in the open position of the lid assembly, the space 50 between the tape run and the partition 25 is completely open or free of any of the portions of the lid assembly that might otherwise interfere with, or limit, the upward insertion of tape loading pins through the cutout 23.

The intermediate part 41B of the skirt portion 41 is desirably angled or bent toward the axis defined by the pivot pins 47 and 48, as shown, so that a forwardly opening recess is defined between the head portion 40 and the upper part of the skirt portion 41 for the reception of the top wall portion 34 of the outer lid member 15 when the lid assembly is in its open position. Moreover, with the top wall portion in the recess, the head portion 40 of the inner lid member 16 forms a smooth inclined extension from the front wall portion 33 of the outer lid member 15.

Furthermore, between the angled part 41B and the head portion 40, the skirt portion 41 of the inner lid member 16 is preferably formed with a rib 52 which, along with the angled part 41B, imparts substantial rigidity to the skirt portion 41 even though the latter may be desirably molded with relatively thin wall sections. By reason of such substantial rigidity, if a user of the cassette 10 extends a finger through the cutout 23 and presses against the skirt portion 41, such pressure will not readily bend or flex the skirt portion in a manner to withdraw the pivot pins from the holes 44 and 45 in the mounting lugs 42 and 43.

Figure 2:
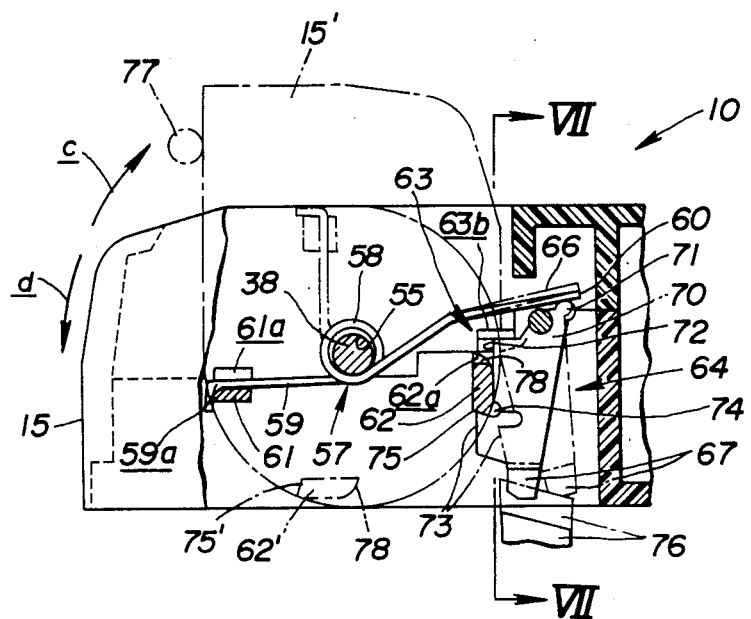
FIG. 2 is an enlarged fragmentary and elevational view of the video tape cassette of FIG. 1 viewed from the right side of FIG. 1 and which is shown with an end wall portion of the cassette housing being broken away and in section for more clearly illustrating a spring and its mounting in a prior embodiment of this invention.
Figure 3:
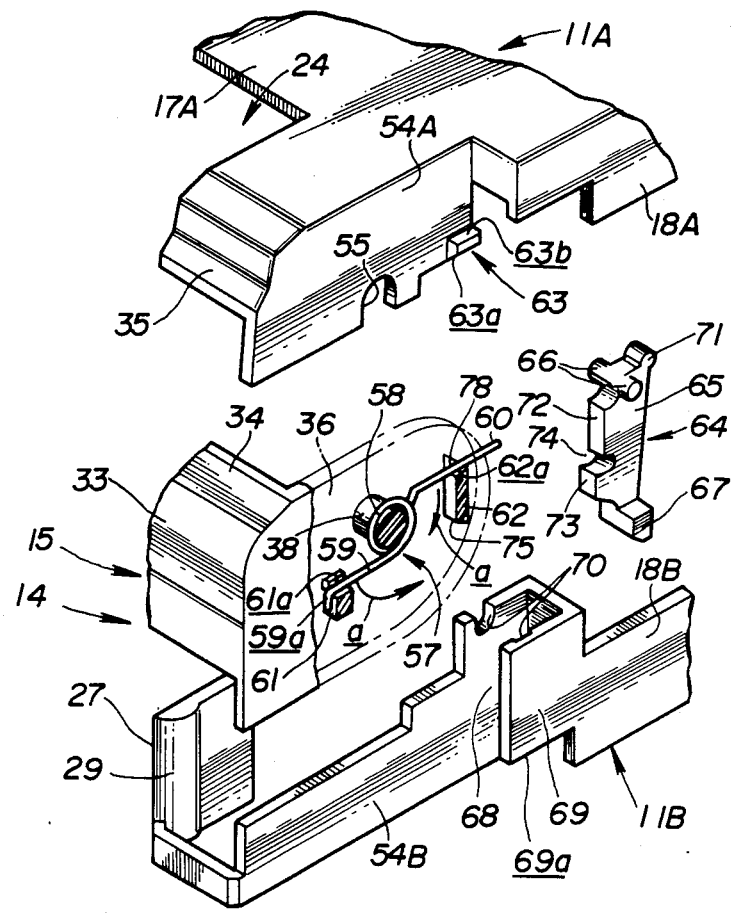
FIG. 3 is an enlarged fragmentary exploded perspective view of portions of the housing and lid structure and of a latch element included in the tape cassette of FIG. 1, and illustrating a first stage in the assembling of such cassette.

As shown particularly in FIG. 3, portions 54A and 54B of the flanges 18A and 18B which define the forward parts of the end walls 19 and 20 are inwardly offset or recessed to accommodate the ears 36 and 37 of the outer lid member 15. Such recessed flange parts 54A at the opposite ends of the upper housing portion 11A are formed with downwardly opening cutouts 55 and 56 (FIGS. 2 and 3) which are shaped to receive and act as pivot seats for the pivot pins or trunnions 38 and 39, respectively, formed on the ears 36 and 37. It will be apparent that, when the housing portions 11A and 11B are vertically assembled together, the seats 55 and 56 in the recessed flange parts 54A are closed, at the bottom, by the upper edges of the corresponding recessed flange parts 54B of the lower housing portion 11B, thereby to prevent removal of the pivotally mounted outer lid member 15 from the assembled housing 11.

While the invention of this application relates to an improved spring and its combination with an alternative latch lock which will be described in detail, the earlier embodiment of the Ser. No. 651,452 parent application will be described for completeness.

Figure 4:
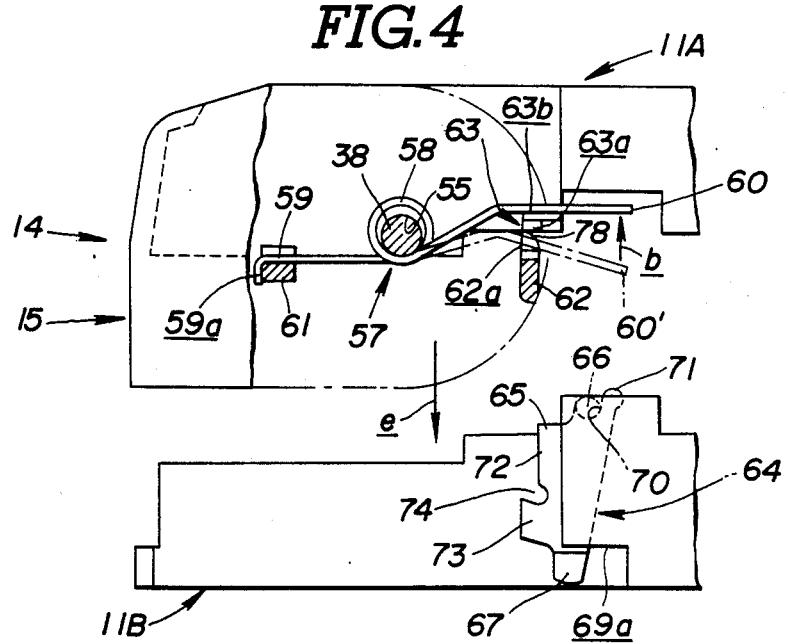
FIG. 4 is a fragmentary and elevational view similar to that of FIG. 1, but illustrating a stage in the assembling of the cassette which is intermediate the initial stage of FIG. 3 and the final or completed stage of FIG. 1.

In order to urge the lid assembly 14 to its closed position, the tape cassette is further shown to include a coil spring 57 which is particularly shown in FIGS. 2, 3, and 4 to include a coil portion 58 and angularly displaced leg portions 59 and 60 extending normally in substantially opposed directions from the coil portion 58 which resiliently resists angular displacement of such leg portions relative to each other. Although only a single coil spring 57 is associated with the pivot pin 38, as hereinafter described in detail, it will be appreciated that a similar coil spring could also be associated with the other pivot pin 39. More particularly, the coil portion 58 of the coil spring 57 is disposed on the pivot pin 38 extending from the inner surface of the ear 36, and the leg portion 59, which desirably has a downwardly bent end 59a, is engaged with a spring anchor 61 which extends inwardly from the ear 36 between the pivot pin 38 and the front wall portion 33 of the lid member 15. The spring anchor 61 desirably has a notch or recess 61a in its upper surface adjacent the inner surface of the ear 36 so that the leg portion 59 can be engaged in such notch or recess 61a for resisting inward removal of the coil portion 58 from the pivot pin 38.

The other leg portion 60 of the coil spring 57 is initially or tentatively engaged with second spring anchor 62 extending inwardly from the ear 36 behind the pivot pin 38, that is, at a location approximately diammetrically opposed from that of the first spring anchor 61. The spring anchor 62 also desirably has a notch or recess 62a in its upper end surface adjacent the ear 36 for receiving the leg portion 60 when initially engaged by the latter, and thereby further preventing inadvertent separation of the coil spring 57 from the ear 36 during the assembling of the lid assembly 14 in respect to the housing 11. Of course, the spring 57 is so shaped that, when the coil portion 58 is disposed on the pivot pin 38 and the leg portions 59 and 60 respectively bear against the anchors 61 and 62, such leg portions 59 and 60 are resiliently urged by the coil portion 58 in the directions of the arrows a on FIG. 3, that is, in the direction for retaining leg portions 59 and 60 in the notches 61a and 62a Further, at least the notch 61a in the anchor 62 has a lateral dimension substantially larger than the diameter of the spring wire forming the coil spring 57 so that the leg portion 60 is free to move laterally within the notch 62a.

In assembling the tape cassette 10 according to this invention, the lid assembly 14 is first associated with the upper housing portion 11A by inserting the pivot pins 38 and 39 vertically upward in the recesses or seats 55 and 56, respectively. Then, the leg portion 60 of the coil spring 57 is manually displaced upwardly in the direction of the arrow b on FIG. 4 so as to be moved out of the notch 62a and into engagement with a third spring anchor 63 formed on the inwardly offset or recessed flange part 54A which eventually forms part of the end wall 19. More particularly, and as shown in FIG. 3, the spring anchor 63 has an oblique or inclined under surface 63a and a horizontal top surface 63b so that, during the manual movement of the leg portion 60 of the spring in the direction of the arrow b in FIG. 4 from the position indicated in dot-dash lines at 60' to the position indicated in full lines, the leg portion 60 is deflected laterally by the oblique surface portion 63a and then snaps back to engage on top of the surface 63b. When the leg portion 60 is thus engaged with the anchor 63, the effect of the coil spring 57 is to securely hold the pivot pins 38 and 39 in the seats or notches 55 and 56, respectively, and further to hold the outer lid member 15 in its closed position with its top wall portion 34 bearing downwardly on the shelf-like forward extensions 35 of the upper housing portion 11A.

The tape cassette 10 is further shown to include a latch element 64 mounted adjacent the end wall 19 of the housing 11 and having an engaged condition shown in full lines in FIG. 2 for locking the lid assembly 14 in its closed position and a released or disengaged condition shown in dot-dash lines in FIG. 2 for permitting movement of the lid assembly to its open position. Further, in accordance with this invention, the coil spring 57 provided for urging the lid assembly 14 to its closed position also acts on the latch element 64, when housing portions 11A and 11B are assembled together, for urging the latch element 64 to the engaged condition thereof. More particularly, as shown in FIG. 3, the latch element 64, which may be suitably molded of a synthetic resin, includes an elongated body 65 with trunnions or pivot pins 66 projecting from the opposite sides of its upper end and an actuating lug 67 projecting laterally outward from the lower end of the body 65. The latch element 64 is received in a forwardly opening space 68 defined between the offset flange part 54B of the end wall 19 and an adjacent extension 69 of the flange 18B, with the trunnions 66 being turnable in substantially semi-circular, upwardly opening seats 70 formed in the upper edges of the flange part 54B and the flange extension 69. Thus, the latch element 64 pivotally depends in the space 68 with the lug 67 projecting outwardly through a cutout 69a at the bottom of the flange extension 69. The upper end of the body 65 further has a rounded abutment or node 71 projecting upwardly therefrom above the pivot pins or trunnions 66 and being spaced rearwardly from the latter. In the assembled cassette embodying this invention (FIG. 2), the abutment or node 71 of the latch element 64 extends substantially above the normal or horizontal surface 63b of the spring anchor 63 so that the leg portion 60 of the coil spring 57 extending behind the anchor 63 is engaged with the node 71 and lifted from the surface 63b of the anchor 63 so as to urge the latch element 64 to pivot in the clockwise direction, as viewed in FIG. 2, about the axis defined by the engagement of the trunnions 66 in the seats 70.

Preferably, in the tape cassette 10, the spring anchor 62 which tentatively or initially engages the leg portion 60 of the coil spring 57 during the mounting of the lid assembly 14 on the upper housing portion 11A, as described above, also functions as a keeper engageable by the latch element 64 in the engaged condition in the latter for holding the lid assembly 14 in its closed position. More specifically, in the closed position of the lid assembly 14, an upper front surface portion 72 of the body 65 is engageable against the anchor or keeper element 62, as shown in full lines in FIG. 2, for limiting the pivoting of the latch element 64 in the clockwise direction under the urging of the leg portion 60 of the spring 57. In such a limited position of the latch element 64, a latch nose 73 defined by a forwardly protruding lower portion of the body 65 separated from the surface 72 by an undercut 74 is engageable by a lower end edge 75 of the anchor 62 as shown in full lines in FIG. 3, for the locking lid assembly 14 in its closed position.

When the tape cassette 10 according to this invention is operatively positioned in a VTR corresponding thereto, a latch release member 76 having an oblique upper end edge is suitably displaced upwardly to the position shown in dot-dash lines in FIG. 2, or otherwise acts upon the lug 67 for angularly displacing the latch element 64 to its released condition shown in dot-dash lines, and in which the nose 73 is retracted or withdrawn from the surface 75 and out of the path of travel of the anchor 62. Thus, the outer lid member 15 is released or freed for angular movement in the direction of the arrow c in FIG. 2 from its closed position shown in full lines to its open position indicated at 15′. For example, such movement of the lid member 15 may be effected by a suitably operated lid opener 77 which is engageable from below with the lid member 15 and is moved in the direction of the arrow c after release or disengagement of the latch element 64 from the spring anchor or keeper 62. By reason of the engagement of follower pins 48 in the cam grooves 32, in the course of the pivotal movement of the other lid member 15 from its closed position to its open position, the inner lid member 16 is pivoted relative to the outer lid member 15 and is transported with the latter.

It will be appreciated that the displacement of the lid assembly 14 from its closed position to its open position is effected against the yieldable resistance of the spring 57. Therefore, upon the removal of the lid opener 77 from engagement with the outer lid member 15, the coil spring 57 is effective to angularly urge the outer lid member 15 in the direction of the arrow d in FIG. 2 for return to the closed position of the lid assembly. In the course of the pivotal or angular movement of the outer lid member 15 in the direction of the arrow d, a curved upper end surface 78 on the anchor or keeper 62 engages the nose 73 of the latch element 64 so as to smoothly displace the nose 73 out of the path of travel of the keeper 62 until the lid member 15 has returned to its closed position and the nose 73 can again engage against the end edge surface 75 for locking the lid assembly in its closed position.

In assembling the tape cassette 10 according to this invention, after the lid assembly 14 has been associated with the upper housing portion 11A, as previously described, the latch element 64 is simply placed in space 68 with its trunnions 66 engaging in the seats 70 of the lower housing portion 11B, as shown in FIG. 4, and then the upper housing portion 11A and the lower housing portion 11B are brought vertically together, as indicated by the arrow e. When the housing portions 11A and 11B are thus brought together in the direction normal to the plane of separation therebetween, the leg portion 60 of the spring 57 is automatically engaged with the node 71 on the latch element 64 so as to raise the leg portion 60 of the spring from the anchor 63 and further to ensure that the latch element 64 is urged to its engaged condition. It will be appreciated that, in the tape cassette embodying this invention, the coil spring 57 is securely associated with the lid assembly 14 during the mounting of the latter on the upper housing portion 11A, and that the coil spring 57, after transfer of its leg portion 60 from engagement with the anchor 62 into engagement with the anchor 63, is automatically positioned for engagement with the node 72 on the latch element 64 in response to bringing together the housing portions 11A and 11B in the vertical direction of the arrow e. Thus, the spring 47 which is intended to perform the dual functions of urging the lid assembly 14 to its closed position and of urging the latch element 64 to its engaged condition, presents no impediment to the easy, and even automatic, assembling of the housing portions.

Referring again to FIG. 1, the tape cassette 10 further includes a brake assembly 80 for preventing turning of reels 12A and 12B in directions which produce slack in the tape run when the cassette 10 is not in use. In accordance with this feature, the brake assembly 80 is capable of being installed in the housing 11 in the vertical direction, that is, in a direction normal to the plane of separation between the housing portions 11A and 11B, whereby further facilitating assembling of the cassette 10.

The brake assembly 80 generally includes a brake body 81, a brake guide structure 82 in the housing 11 at a location between the reels 12A and 12B adjacent the side of the housing remote from the opening 22 and is operative to guide the brake body 81 in the fore and aft direction, that is, in a direction parallel to the plane of separation of housing portions 11A and 11B, between engaged and disengaged positions. A pair of diverging, resilient blade-like extensions 83A and 83B project from the brake body 81 toward the reels 12A and 12B, respectively, and are engageable with toothed peripheries 84A and 84B provided on the lower flanges 85A and 85B of the reels 12A and 12B, respectively. A plate spring member 86 is also installed in housing 11 in the direction normal to the plane of separation of the housing portions 11A and 11B for urging the brake body 81 to its engaged position.

The guide structure 82 is formed or molded in the lower housing portion 11B so as to have forwardly converging, curving side portions directed upwardly from the bottom wall 17B and extending from laterally spaced locations on the flange 18B at the back of the cassette housing. The curving side portions of the guide structure are substantially concentric with the reels 12A and 12B and are spaced apart, at their forward ends, by a distance smaller than the maximum width of the brake body 81. The guide structure 82 further has parallel guide walls spaced apart laterally so as to be adapted to slidably guide the brake body 81 therebetween for to and fro movements. The back ends of the parallel guide walls are spaced from the flange 18B at the back of the housing portion and have bevelled or inclined upper corners 89'A and 89'B. Further, the guide wall has a cutout 90 in its back end portion. The bottom wall 17B of the housing portion 11B desirably has a recess in its upper surface in the region of the guide structure and an opening which is substantially laterally centered within the recess. Spring locating ribs are directed forwardly at laterally spaced locations on the flange 18B at the back of the cassette housing so as to be located laterally outward in respect to guide walls 88A and 88B, respectively.

Figure 5:
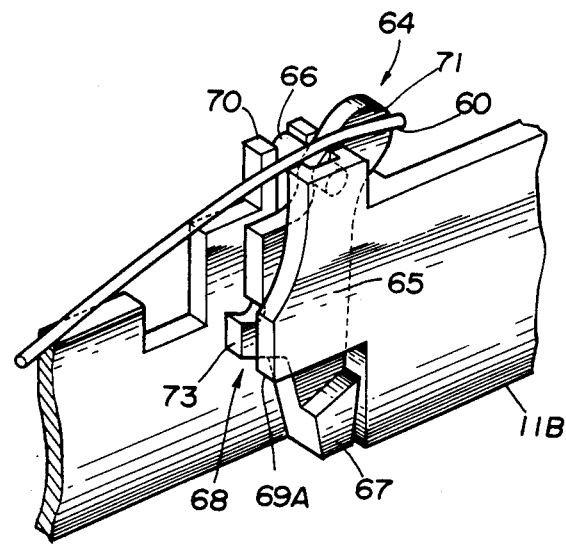
FIG. 5 is a view of a portion of a coil spring disengaged from a latch member for describing a problem to which the invention of this embodiment is directed.

FIG. 5 depicts a potential for difficulty in the embodiment of FIGS. 1-4 which is resolved according to the invention. Thus, like reference numerals have been used. In the situation of FIG. 5, the angularly displaced leg portion 60 of the coil spring 57 has been displaced laterally relative to the rounded abutment portion 71 of the latch element 64. Such displacement may occur, for example, from an impact on the cassette 10 caused by dropping the cassette. As a result, the free movement under the influence of the coil spring 57 of the latch element 64 is lost. In a case where the diameter of the coil spring 57, and in particular, the diameter of the leg portion 60 is small, there is a further risk that the leg portion 60 will also displace slightly vertically to rest on the trunnion or pivot pin 66 on either side of the elongated body 65 adjacent to the inner walls defining the forwardly-opening space 68 in the area of the seats 70 for receiving the trunnions or pivot pins 66.

Figure 6:
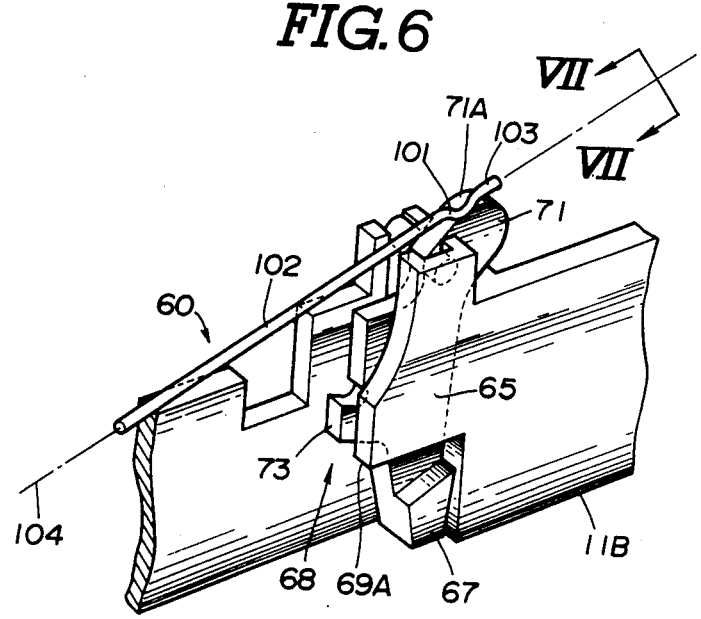
FIG. 6 is a view similar to FIG. 5 showing an impiroved coil spring according to the invention in contact over a larger area with an abutment surface of the latch member.

Accordingly, FIG. 6 shows an alternative structure which is the main focus of this application in which the leg portion 60 of the coil spring 57 defines a bent portion 101 in the area of its contact with the abutment portion 71 of the latch member 64. Preferably, the bent portion 101 is formed in the leg 60 of the coil spring by bending and permanently deforming the portion 101 in a semi-circular shape so that a length 102 and an end length 103 remain approximately colinear. While the bent portion 101 may be located at the distal end of the length 102 of the leg 60, it is preferred that the bent portion 101 be located somewhat remote from the distal end of the leg portion 60 to define a trailing member 103 on the leg portion 60. Such a bent portion 101 increases the effective area of contact with the abutment surface 71 on the latch member 64 and avoids the problem discussed in connection with FIG. 5. In effect, the area of contact is increased because the abutment portion "sees" a semi-circular area developed by the bent portion 101, rather than a line contact.

Figure 7:
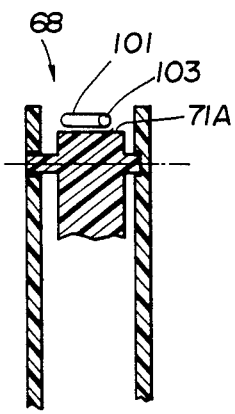
FIG. 7 is an end view, partially cut away and in section, showing the orientation of the improved coil spring relative to the abutment surface, taken in the direction of the arrows 7—7 in FIG. 6.
Figure 8:
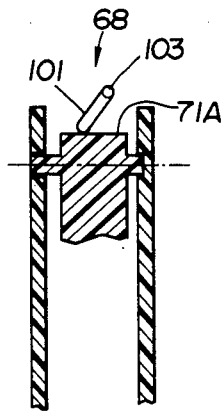
FIG. 8 is a view similar to FIG. 7 showing an alternative orientation of a bent portion of the improved spring according to the invention.

As best shown in the partial cross section of FIG. 7, the bent portion 101 is preferably formed in a plane passing through the axis 104 of the leg portion 60 so that the bent portion 101 may rest on the rounded outermost surface of the abutment member 71 as shown in FIG. 7. In the alternative, as shown in FIG. 8, the angle subtended by the plane of the bent portion 101 may be at an angle relative to a line in the surface of the rounded member 71. While the embodiment of FIG. 8 is not as preferable as that of FIG. 7, it inhibits the lateral transfer of the leg portion 60 so that the leg portion may not slip over an outer edge of the abutment portion 71 and lose contact therewith, thus reducing the spring action of the coil spring 57.

Figure 9:
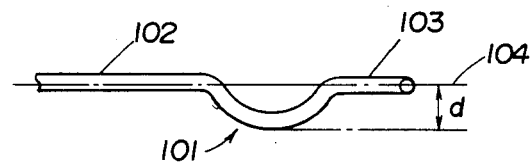
FIG. 9 is a plan view of the distal end portion of the spring member according to the invention.

As further shown in FIG. 9, the distance d from the axis 103 to the most remote portion of the bent portion 101 is approximately equal to one-half of the width of the abutment member 71. Such a maximum extent of the bent portion 101 may be increased to a distance which is limited by the distance between the inner surfaces of the chamber 68 with adequate tolerance to permit free movement in that cavity. It can thus be seen from FIG. 7 that any tendency of the leg portion 60 to slide laterally on the abutment surface 71 will be limited in one direction by a contact with the most remote portion of the bent portion 101 with an interior wall of the chamber 68. Lateral movement in the other direction which might otherwise have caused the leg portion 60 to lose contact with the abutment surface 71 will result in the bent portion 101 maintaining contact with the abutment portion when the axially-directed leg portions 102 and 103 are in an extreme rightward position as shown in FIG. 7.

The material of the spring 57 is such that forming the leg portion 60 into portion 102, 101, and 103 is an easy bending operation which results in permanent deformation in the spring member.

Figure 10A:
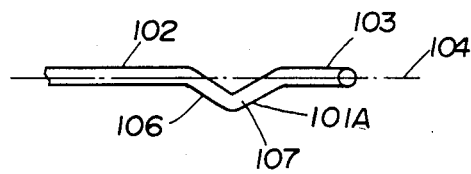
FIGS. 10A–10C respectively show alternative shapes for the bent portion of the spring member of the invention.
Figure 10B:
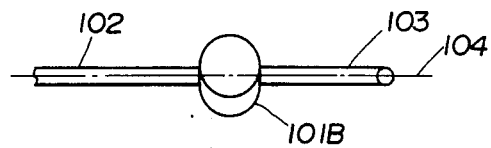
Figure 10C:
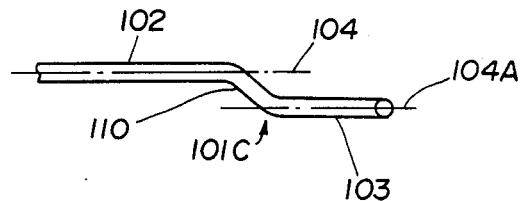

FIGS. 10A, 10B, and 10C show alternative forms for shaping the bent portion 101 to achieve the results of the invention in substantially the same way. Thus, in FIG. 10A, the bent portion is formed from two substantially linear segments 106 and 107 forming a triangular shape structure having its apex at a distance d from the axis 104. FIG. 10B shows an alternative embodiment wherein the bent portion 101B is defined by a loop in the leg portion 60 of the coil spring. The loop 101B may be formed by coiling the leg 60 about one turn so that the distal portion 103 remains approximately colinear with the portion 102. Alternatively, the coiled portion 101B may be a separate element secured to an otherwise linear leg 60 as a separate circular element and secured by a manner known to the art. Such an embodiment is not presently preferred.

In FIG. 10C, still another embodiment is shown in which the bent portion 101C is defined by a linear portion 101 merging the leg portions 102 and 103 in such a way that the distal leg portion 103 is axially offset at a distance d from the axis 104 as shown by the axis 104A. In the case of the embodiment of FIG. 10C, the portion 101C is in contact with the abutment end and the offset d between the leg portions 102 and 103 inhibits lateral transfer of the spring in the space 68 intermediate the interior wall of the channel.

Returning to FIG. 6, the cooperation between the bent portion 101 and the abutment surface 71 on the latch element 64 is further improved by reshaping the rounded abutment end of the latch element to define an extended contact surface 71A. Preferably, the extended contact surface 71A lies at an angle approximately defined by the angle subtended by the leg portion 60 along its axis 103. By presenting an elongated contact surface 71A to the bent portion 101, the surface to surface contact between the effective area defined by the bent portion 101 and the enhanced area 71A of the abutment portion of the latch element further maintains the desired cooperation between the spring 57 and the lid element 64.

The invention may be embodied in other specific forms without departing from its spirit or essential charactertistics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A magnetic tape cassette comprising a lid structure pivotally mounted on a housing for movement by a coil spring from an open position exposing a tape run to a closed position in which the lid structure covers the tape run, said coil spring comprising an end portion cooperating with a latch element for releasably latching said lid structure in at least one of said open and closed positions, said latch element further including an abutment end for engaging an end portion of said coil spring the end portion of said coil spring further including a leg portion defining an effective area of contact with the abutment end of said latch member, which effective area is greater than that presented by a length of said leg portion to said abutment end for a given diameter of said leg portion.

2. The cassette as set forth in claim 1, wherein said leg portion is formed into a non-linear shape to define said effective area.

3. The cassette as set forth in claim 2, wherein said non-linear shape is semi-circular.

4. The cassette as set forth in claim 3, wherein the semi-circularly-shaped leg portion is located near a distal end of said leg portion, the portions of said leg portion on either side of same semi-circularly-shaped leg portion being colinear.

5. The cassette as set forth in claim 2, wherein said non-linear shape is defined by a first leg portion merging with a second leg portion obliquely-inclined relative to said first leg portion.

6. The cassette as set forth in claim 2, wherein said non-linear shape is circular.

7. The cassette as set forth in claim 2, wherein a plane containing said non-linear shape lies approximately parallel to a plane of the contacting surface on the abutment end of said latch element.

8. The cassette as set forth in claim 2 wherein said non-linear shape is semi-circular and a plane containing said non-linear shape lies approximately parallel to a plane of the contacting surface on the abutment end of said latch element.

9. The cassette as set forth in claim 1, wherein said abutment end said latch element for said lid structure further defines an enhanced area for surface contact with the effective area defined by said end portion of said coil spring.

10. The cassette as set forth in claim 1, wherein said abutment end defines a contacting surface which essentially lies in a plane, so that a plane containing said effective area of said leg portion of said coil spring lies approximately parallel to the plane of said contacting surface.

11. A magnetic tape cassette comprising a lid structure pivotally mounted on a housing for movement by a resilient member from an open position exposing a tape run to a closed position in which the lid structure covers the tape run, said resilient member comprising an end portion cooperating with a latch element for releasably latching said lid structure in at least one of said open and closed positions, said latch element further including an abutment end for engaging an end portion of said resilient member, the end portion of said resilient member further including a leg portion defining an effective area of contact with the abutment end of said latch member which effective area is greater than that presented by a length of said leg portion to said abutment end of a latch member for a given diameter of said leg portion.

* * * * *

UNITED STATES PATENT AND TRADEMARK OFFICE
CERTIFICATE OF CORRECTION

PATENT NO. : 4,663,688

DATED : May 5, 1987

INVENTOR(S) : Shin Sasaki; Masahiro Makino

It is certified that error appears in the above-identified patent and that said Letters Patent is hereby corrected as shown below:

The foreign application priority date, at item 30 on the face page of the patent should read:

January 19, 1985 [JP] Japan ........60-5576

Signed and Sealed this

Third Day of November, 1987

Attest:

DONALD J. QUIGG

Attesting Officer

Commissioner of Patents and Trademarks